US009047235B1

(12) United States Patent
Barraclough et al.

(10) Patent No.: US 9,047,235 B1
(45) Date of Patent: Jun. 2, 2015

(54) CONTENT MANAGEMENT FOR PACKET-COMMUNICATING DEVICES

(75) Inventors: Keith Barraclough, Mountain View, CA (US); David Irvine, San Jose, CA (US)

(73) Assignee: NOKIA CORPORATION, Espoo (FI)

(*) Notice: Subject to any disclaimer, the term of this patent is extended or adjusted under 35 U.S.C. 154(b) by 2227 days.

(21) Appl. No.: 11/966,697

(22) Filed: Dec. 28, 2007

(51) Int. Cl.
*G06F 15/16* (2006.01)
*H04L 29/08* (2006.01)

(52) U.S. Cl.
CPC ............ *G06F 15/16* (2013.01); *H04L 67/2847* (2013.01)

(58) Field of Classification Search
CPC .................... G06F 15/16; H04L 67/2847
USPC .......................... 709/217; 705/26.1
See application file for complete search history.

(56) References Cited

U.S. PATENT DOCUMENTS

| | | | |
|---|---|---|---|
| 4,979,118 A | 12/1990 | Kheradpir | |
| 5,774,660 A | 6/1998 | Brendel et al. | |
| 5,862,325 A | 1/1999 | Reed et al. | |
| 5,920,701 A | 7/1999 | Miller et al. | |
| 5,996,022 A | 11/1999 | Krueger et al. | |
| 6,006,264 A | 12/1999 | Colby et al. | |
| 6,031,797 A * | 2/2000 | Van Ryzin et al. | 369/30.28 |
| 6,067,565 A | 5/2000 | Horvitz | |
| 6,112,225 A | 8/2000 | Kraft et al. | |
| 6,161,133 A | 12/2000 | Kikinis | |
| 6,167,438 A | 12/2000 | Yates et al. | |
| 6,308,209 B1 | 10/2001 | Lecheler | |
| 6,308,222 B1 | 10/2001 | Krueger et al. | |
| 6,493,758 B1 | 12/2002 | McLain | |
| 6,577,601 B1 | 6/2003 | Wolpert | |
| 6,678,244 B1 | 1/2004 | Appanna et al. | |
| 6,697,333 B1 | 2/2004 | Bawa et al. | |
| 6,751,664 B1 | 6/2004 | Kogan et al. | |
| 6,871,236 B2 | 3/2005 | Fishman et al. | |
| 6,888,477 B2 | 5/2005 | Lai et al. | |
| 6,937,168 B2 | 8/2005 | Rao et al. | |
| 7,120,702 B2 | 10/2006 | Huang et al. | |

(Continued)

FOREIGN PATENT DOCUMENTS

EP          1 860 581 A1    11/2007
WO     WO 2005/034373 A2    4/2005

OTHER PUBLICATIONS

Chinese Office Action for CN Application No. 2008801232615 dated Nov. 2, 2011, pp. 1-16.

(Continued)

*Primary Examiner* — O. C. Vostal
(74) *Attorney, Agent, or Firm* — Ditthavong & Steiner, P.C.

(57) ABSTRACT

Media content associated with a playlist is provided for remote access over a packet-based network. According to an example embodiment of the present invention, a host server provides access to a user-defined playlist depicting media content available from user's media content source (e.g., at a registered user's PC). User-defined playlists and associated media content are managed to facilitate access to media in accordance with characteristics of the media content and/or playlist such as format and bitrate, and as may be related to an intended playback use of the playlist. Media content for the playlists is stored in a network storage device for remote access, with the storage managed to facilitate remote access in appropriate formats, with selective cross-referencing among playlists for different playlist types, content format and content bandwidth.

30 Claims, 4 Drawing Sheets

(56) References Cited

U.S. PATENT DOCUMENTS

| | | | |
|---|---|---|---|
| 7,139,834 | B1 | 11/2006 | Albanese et al. |
| 7,200,575 | B2* | 4/2007 | Hans et al. ............... 705/59 |
| 7,280,975 | B1* | 10/2007 | Donner ..................... 705/10 |
| 7,483,958 | B1* | 1/2009 | Elabbady et al. ......... 709/217 |
| 7,546,372 | B2* | 6/2009 | Allen et al. ............... 709/229 |
| 2002/0026521 | A1* | 2/2002 | Sharfman et al. ......... 709/231 |
| 2002/0174246 | A1 | 11/2002 | Tanay et al. |
| 2003/0061387 | A1 | 3/2003 | Brown et al. |
| 2003/0110234 | A1 | 6/2003 | Egli et al. |
| 2003/0177269 | A1 | 9/2003 | Robinson et al. |
| 2003/0200337 | A1 | 10/2003 | Jabri et al. |
| 2004/0003132 | A1 | 1/2004 | Stanley et al. |
| 2004/0078357 | A1* | 4/2004 | LaChapelle et al. ......... 707/2 |
| 2004/0139233 | A1 | 7/2004 | Kellerman et al. |
| 2004/0250291 | A1 | 12/2004 | Rao et al. |
| 2004/0267954 | A1 | 12/2004 | Shen |
| 2005/0091690 | A1* | 4/2005 | Delpuch et al. ............ 725/88 |
| 2005/0132264 | A1 | 6/2005 | Joshi et al. |
| 2005/0193341 | A1* | 9/2005 | Hayward et al. ........... 715/716 |
| 2005/0240494 | A1* | 10/2005 | Cue et al. ................... 705/27 |
| 2005/0246193 | A1* | 11/2005 | Roever et al. ............... 705/1 |
| 2006/0008256 | A1 | 1/2006 | Khedouri et al. |
| 2006/0143236 | A1 | 6/2006 | Wu |
| 2006/0184972 | A1 | 8/2006 | Rafey et al. |
| 2006/0265403 | A1* | 11/2006 | Mercer et al. ............... 707/10 |
| 2006/0294201 | A1* | 12/2006 | Kito et al. ................... 709/217 |
| 2007/0136753 | A1* | 6/2007 | Bovenschulte et al. ....... 725/46 |
| 2007/0162487 | A1* | 7/2007 | Frailey ........................ 707/102 |
| 2007/0198363 | A1* | 8/2007 | Quoc et al. .................. 705/26 |
| 2007/0233613 | A1* | 10/2007 | Barrus et al. ................ 705/71 |
| 2007/0239724 | A1* | 10/2007 | Ramer et al. ................ 707/10 |
| 2007/0286232 | A1* | 12/2007 | Binder ......................... 370/465 |
| 2008/0009268 | A1* | 1/2008 | Ramer et al. ................ 455/412.1 |
| 2008/0172372 | A1* | 7/2008 | Shacham et al. ............. 707/5 |
| 2008/0183840 | A1* | 7/2008 | Khedouri et al. ............ 709/217 |
| 2008/0195664 | A1* | 8/2008 | Maharajh et al. ............ 707/104.1 |
| 2008/0301187 | A1* | 12/2008 | Svendsen .................... 707/104.1 |
| 2008/0320002 | A1* | 12/2008 | Bodlaender et al. ......... 707/10 |
| 2009/0157792 | A1* | 6/2009 | Fiatal ........................... 709/201 |
| 2009/0313225 | A1* | 12/2009 | Nordlinger ................... 707/3 |
| 2010/0157851 | A1* | 6/2010 | Farah ............................ 370/260 |

OTHER PUBLICATIONS

Korean Office Action for KR Application No. 2010-7016960 dated Dec. 23, 2011, pp. 1-4.

Extended European Search Report for Application No. 08868193.7-1225/2225659, dated Aug. 24, 2012, pp. 1-8.

Nov. 1999, "BackWeb® Foundation 5.5 Technical White Paper".

May 25, 2000, Ben Hammer, "GPS to do wonders for wireless browsing" posted on the world wide web.

* cited by examiner

CONTENT MANAGEMENT FOR PACKET-COMMUNICATING DEVICES

FIELD OF THE INVENTION

The present invention relates generally to communications and, more particularly, to the control and routing of content such as media content for remote access.

BACKGROUND OF THE INVENTION

Media content communications over a variety of networks, such as packet-based networks, mobile telephone networks and others have increased at an astonishing rate over recent years. The affordability and availability of computers, telephones, wireless devices and other network access appliances has made their use prevalent in a variety of applications. Further, as the demand for network access devices has increased, the diversity in types of network access appliances has also increased, with different devices often implementing different protocols and performance-based operational characteristics.

As access to packet-based networks such as the Internet becomes easier, convenient and readily available, these networks are increasingly used for transferring media content such as images, audio, email, video and text. In this regard, the number of network subscribers, media content providers, and requests by those subscribers for media content transfer, streaming media content and other content are growing exponentially. Users are increasingly relying upon such networks for media content transfer, and are further placing higher expectations on their ability to access content at different locations using different network access devices in a flexible, controllable manner.

Media content (e.g., audio, images or video) has evolved in application, is often stored electronically and is readily transferable over packet-based networks as described above. For example, the storage of music and/or video in rewritable electronic media has become a popular method in which to maintain and access media collections. For video applications, digital recording and storage of television and personal video collections has become popular, as has the streaming (via the Internet) of stored video. Similarly, audio is often stored in electronic media, transferred to portable devices or streamed via the Internet using a packet-based approach to provide the audio to an Internet device such as a computer.

In many applications, user access to media content by users owning or subscribing to the media content, or by guests with whom a user wishes to share her or his content, is desirably flexible and controllable. For example, owners of digital audio content often desire access to their content from a variety of different devices, such as a personal audio player, an automobile audio system, or a home audio system. However, previous approaches to media access and sharing have often been limited in the ability to deliver media content to different devices, over different communications mediums and in different formats. For instance, certain types of media require a particular type of software or hardware in order to facilitate playback. In addition, some media content requires a relatively large amount of bandwidth in order to play the media at a desirable quality.

As may be related to the above challenges presented by the storage of and access to digital media, managing and accessing digital media collections including disparate types of media content in different formats, for playback at different types of devices, can also be challenging. For instance, for audio content, the audio is often stored in different formats, depending upon characteristics such as the audio source, the type of audio or user selections made in purchasing and/or storing the audio. One characteristic of stored audio format is the bitrate at which the audio is stored; higher bitrate generally requires larger memory and, where streamed over a packet-based network, generally requires higher bandwidth. Applications involving insufficient memory storage or insufficient bandwidth may be unable to access and playback audio content stored at a high bitrate. In this regard, users often store audio content in different formats, such as a lossless format for home audio use, and a lower bitrate for use with mobile digital audio players such as flash memory-based players. These disparate formats can become difficult to track, relative to one another, and difficult to access in a manner that is readily understood and that facilitates the provision of the audio in a proper format for a particular application.

Effectively and efficiently making content and other media content readily accessible has been challenging in the face of the advancement of technologies and trade channels that use or could use network-based media transfer.

SUMMARY OF THE INVENTION

The present invention is directed to approaches to media content routing, management and associated applications for making a registered user's media remotely accessible. The present invention is exemplified in a number of implementations and applications, some of which are summarized below.

According to an example embodiment of the present invention, an approach to media content access and delivery involves the management of disparate types and/or arrangements of media content for storage and network-hosted playback under a variety of conditions. A network host facilitates controlled remote access to registered-user media content that is stored at a registered user's network device and/or stored on behalf of a registered user.

According to another example embodiment of the present invention, a system provides media content for remote access over a packet-based network for playlists identifying one or more registered-user media content titles. The system includes a network-based storage arrangement that stores media content and playlist data using a cross-referencing file structure to selectively identify each media content title under at least two playlists, and selectively identifies at least two formats of media content files for each media content title. A registered-user packet-based media arrangement sends playlist-based media content to the network-based storage arrangement over the packet-based network. A host server receives and authenticates playlist requests, and in response to the authentication of a request for a playlist, facilitates the delivery of media content files from the network-based storage arrangement to a remote playback device, using the cross-referencing file structure to identify the media content files associated with the requested playlist.

In another example embodiment, media content is provided for remote access over a packet-based network for playlists identifying one or more registered-user media content titles. Media content and playlist data is stored using a cross-referencing file structure to selectively identify each media content title under at least two playlists, and selectively identify at least two formats of media content files for each media content title. Playlist-based media content is sent from a registered-user packet-based media arrangement to the network-based storage arrangement over the packet-based network. At a host server, playlist requests are received and authenticated and, in response to the authentication of a request for a playlist, the delivery of media content files from the network-based storage arrangement to a remote playback device is facilitated using the cross-referencing file structure to identify the media content files associated with the requested playlist.

According to another example embodiment of the present invention, remote-user access to media content specified in playlists is facilitated in an environment involving registered users that provide media content for transfer over a packet-based network for use at a remote packet-communicating device. In response to a user-request for establishing a playlist, a playlist identifier and a list of encoding identifiers are generated, each encoding identifier specifying an encoded version of a media content file to be placed in the network-based storage device. Media content files in the playlist are compared with media content files in a network-based storage arrangement to identify media content files to be sent to the network-based storage arrangement. The identified media content files are selectively transcoded as a function of the encoding identifiers, and the selectively transcoded media content files are sent to the network-based storage arrangement. In response to an authenticated playlist request specifying the playlist identifier, the media content in the playlist is delivered (e.g., streamed) from the network-based storage arrangement to a remote media playback device over a packet-based network.

According to another example embodiment of the present invention, a system having a registered-user packet-based media arrangement that sends playlist-based media content over the packet-based network, facilitates remote access to playlist-based media content over a packet-based network and access to playlists identifying one or more registered-user media content titles. The system includes a network-based storage arrangement that stores media content and playlist data, received from a registered-user packet-based media arrangement, using a cross-referencing file structure to selectively identify each media content title under at least two playlists and at least two formats of media content files for each media content title. A host server receives and authenticates playlist requests and, in response to the authentication of a request for a playlist, facilitates delivery of media content files from the network-based storage arrangement to a remote playback device, using the cross-referencing file structure to identify the media content files associated with the requested playlist.

The above summary of the present invention is not intended to describe each embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
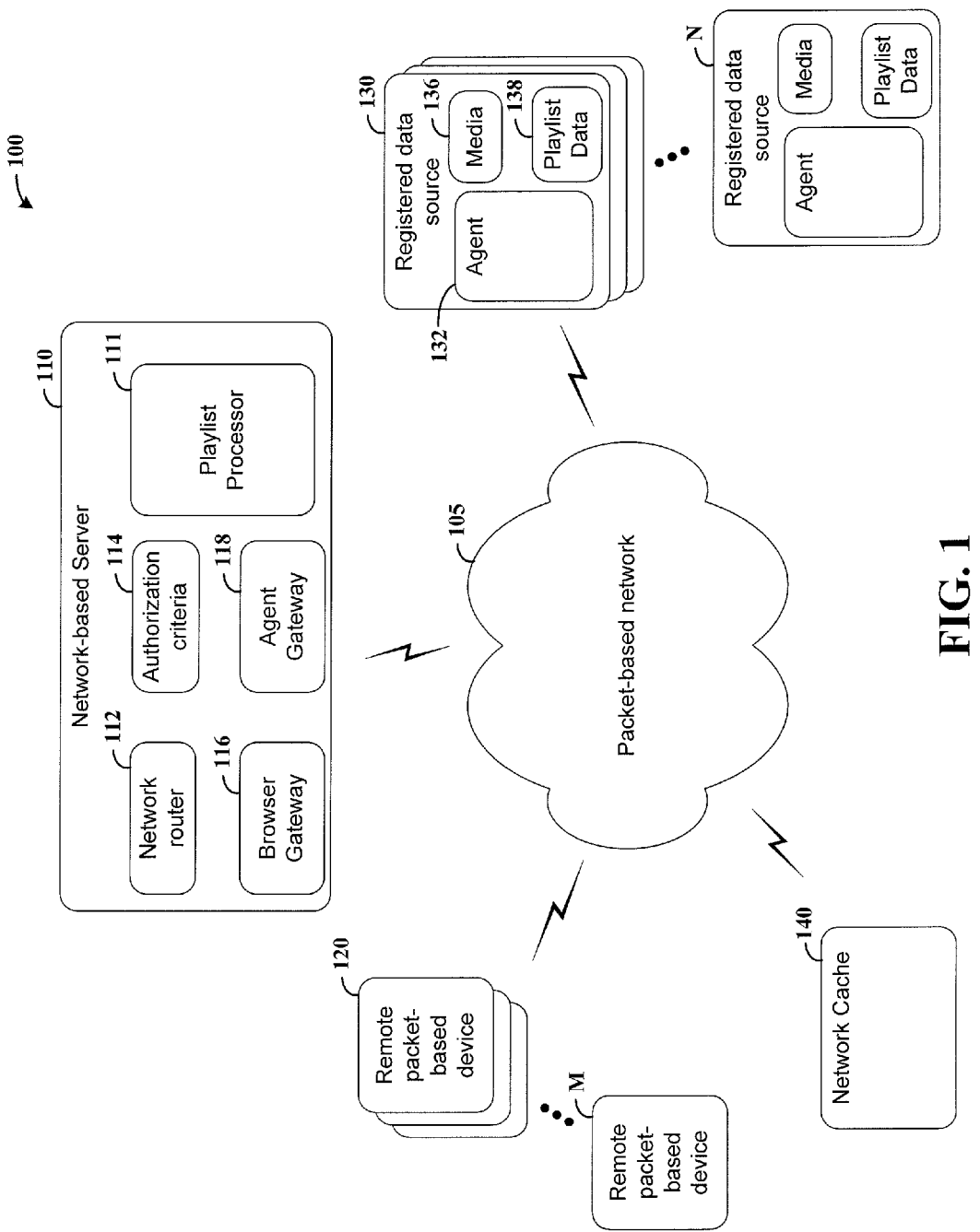
FIG. 1 is a system for routing media content via a packet-based network using a hosted access approach, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of communications, and the invention has been found to be particularly suited for providing remote access to registered-user media content via a packet-based network such as the Internet. While the present invention is not necessarily limited to such applications, various aspects of the invention may be appreciated through a discussion of various examples using this context.

In connection with various example embodiments of the present invention, a host server interacts over a packet-based-network with a registered user's media content source and an authorized user at a remote media playback device to provide playlist-based media content from the media content source to the remote device. This media content is provided either directly from the content source or via a network storage arrangement that stores select media content provided by the media content source. In these applications, the remote user may be, for example, a registered user or a guest to which playlist access has been granted.

The host server provides an interface, such as an Internet web page, for access by the remote user in requesting, controlling or otherwise interacting with a media playlist associated with the registered user. The host server uses authentication criteria to authenticate the remote user, prior to facilitating any media playlist access to the remote user. In accordance with a remote user request or other information characterizing media playlist selections, the host server interacts with the media content source and/or network storage arrangement to direct the delivery of playlist-based media content to the remote media playback device over the packet-based network.

The registered user's media content source includes a software-implemented agent processor that responds to controls received from the host server, facilitates the management of playlists and further facilitates communications between the host server and the content source. The media content source is generally either packet-based itself, or is coupled to a packet-based device to facilitate the delivery of media content from the media content source over a packet-based network (e.g., to the network storage arrangement). In this regard, the media content source, as referred to above and/or in other locations herein, generally refers to a single device and/or a system that is capable of both presenting media content for transfer over a packet-based network and of communicating over the packet-based network. For instance, one such device/system involves an Internet modem and a personal computer that stores and/or has access to media content directly or via a communications link such as a LAN. Other media content sources may include one or more of a media recorder (e.g., a digital video recorder or digital audio recorder), a broadcast receiving device (e.g., a television receiver, radio receiver or satellite receiver), a gaming device, a mobile telephone or other packet-communicating devices. The agent processor communicates with the host to establish a communications link therewith, and facilitates media content transfer at the direction of the host (or at the direction of user commands received from a remote registered user or a registered user a the content source). In some applications, media content transfer is via the host, and in other instances, directly from the media content source to a remote media playback device.

Generally, the host server and agent processor facilitate the establishment and management of media content playlists by a registered and/or remote user by facilitating the association of media content or other objects with a particular playlist or playlists. The association is made relative to content and/or content delivery characteristics such as media type, bitrate, rights protection, device type and communications link type. For instance, where a registered user wishes to group audio tracks into a playlist, the registered user facilitates the grouping by interacting with the host server, agent processor and/or other software at the media content source. The host server and/or the agent processor manage the playlist grouping selections in accordance with the content and/or content delivery characteristics discussed above, and where appropriate, cross-list media content with different playlists, and further cross-list different formats of a particular media content item (e.g., an audio track stored at two locations at different bitrates). In some embodiments, media content is automatically assigned to a playlist based upon a variety of conditions, such as user-defined preferences, user-access history, known user activities corresponding to date and/or time, or related characteristics of stored media content.

Media content that is selected for inclusion with a particular playlist is associated with that playlist in one or more of a variety of manners, depending upon the application. In some applications, the host server and/or software at the content source maps or otherwise identifies selected media content with data characterizing the contents of a playlist using data indicating, for example, one or more of a file name, file location or metadata for the content. In other applications, the selected media content is placed in a particular file location at the content source or the network storage arrangement and controlled by the host server. In connection with the above discussion, media content is cross-referenced as appropriate using these approaches to playlist association, where media content is associated with two or more playlists and where a certain media content file (e.g., a video) is stored in different formats (e.g., in the network storage arrangement). Cross-referencing in this manner facilitates, for example, the storage of a particular media content file belonging to two or more playlists without necessarily duplicating the media content file.

The host server and/or the agent processor control the format of media content in playlists to facilitate playback at one or more different remote media playback devices, using one or more different playback approaches, with delivery via one or more different types of communications mediums and, in some applications, using one or more different types of media rights protection. In some applications, this formatting approach is playlist-specific. In other applications, this formatting approach is content-specific. In still other applications, this formatting approach is both playlist-specific and content-specific, such as by formatting an entire playlist to a particular bitrate, but individually formatting items in the playlist in accordance with media type and/or media rights protection for the item. Where media content items such as an audio track is associated with more than one playlist, where each playlist requires different formatting, the content items are stored in two different formats in accordance with each playlist, with each instance of the stored content item associated with the playlist for which it is formatted. In this regard, a particular media content item may be stored in different formats for different playlists.

Once a playlist is established, one or both of the host server and the agent processor control the population of the network storage arrangement to store content for the playlist for remote access. For instance, where a particular registered user wishes to make a particular playlist or set of playlists remotely available, the network storage arrangement is populated with media content for the particular playlist or playlists in an appropriate format (e.g., as indicated via an intended device to use for playback). The host server implements the agent processor to direct the population of the network storage arrangement with appropriate media content from a registered-user's content source in accordance with playlist selections indicated above. Where applicable, the agent processor directs the storage of media content in particular format in the network storage arrangement, and in some applications, directs the formatting of media content to be stored. For instance, where content storage space may be limited, where delivery of content is to a device requiring low bandwidth, or where delivery is over a bandwidth-limited communications link, media content stored in the network storage arrangement is stored in a reduced-bandwidth format.

When remote access to a playlist having media content in a network storage arrangement is no longer desired, when a playlist is deleted or when a playlist expires (e.g., as indicated by an expiration date set by a registered user), media content associated with the playlist is selectively deleted from the network storage arrangement. The selective deletion involves, for example, deleting media content items that belong specifically to a playlist being deleted, and not deleting media content items that are needed for use with other playlists or for other purposes.

The host server and/or agent processor facilitates the modification of playlists by selectively creating, modifying or deleting media content located in a network-based cache and, in some applications, at a registered user's media content source. For instance, when a playlist is modified to add or remove media content items from the playlist, the playlist is accordingly modified. If media content is to be removed from a playlist having content stored in a network cache, the content is selectively deleted as described above. When media content is to be added to a playlist (e.g., in response to registered-user or remote-user selections), the media content is associated with the playlist and, where appropriate, a modified version of the media content is created to suit one or more of delivery, playback or protection needs as described above. Where a user requests modification of a playlist, such as by requesting that the playlist be deliverable in a reduced-bandwidth format, the media content stored for the playlist is modified or another version of the media content is created.

Where media content to be removed from a playlist is stored at a registered user's content source, the media content may be deleted; such deletion is applicable, for example, where the media content is stored in an original format as well as in a modified format amenable for transfer over the packet-based network. For instance, where a registered user purchases and stores downloadable music (audio) at his or her home PC or digital audio storage device, the user generally prefers to maintain a copy of his or her music at a quality level provided via the downloaded. Where such music is added to a playlist, a second, reduced-quality copy may be desirably created, or a second copy may be created in another format that is amenable for use at a particular type of remote playback device (e.g., transcoded into a format that the remote playback device can use). This second copy is pushed to a network storage arrangement for remote access. When a playlist is modified or deleted, the host server and/or agent processor ensure that the originally-stored music is maintained intact.

The above discussion applies generally to a multitude of different systems, devices, networks and communications approaches. For illustrative purposes, the following discusses one particular example embodiment involving a media communications system and approach, aspects of which may be implemented using, for example, one or more of the approaches shown in and described above and/or in connection with the figures.

A user having a home-based local area network (LAN) registers with a host server for remote media content access, and installs agent processor software on a personal computer (PC) connected to the home LAN. The user (now a registered user) sets preferences, such as access criteria (user name, password), media to add to playlists and media sources from which to provide media. For purposes of illustration, the user creates one or more media playlists that include one or more of recorded television programs or other video present on the user's digital video recorder, music stored on a digital audio player, and images stored on the user's PC.

Once registered, the user's PC connects to the host server upon power up or other condition, such as a user-initiated connection. The host establishes a persistent connection to the user's PC to facilitate remote access at a later time. The software programmed to the user's PC works with the host server to maintain this connection, and is responsive to commands from the host server in this regard, as well as for facilitating the transfer of media content associated with playlists.

When a user wishes to establish a playlist, the user interacts with one or both of the agent processor and the host to make selections for the playlist. For instance, where a registered user creates a playlist at his or her home PC, that user may interact directly with the agent processor to create the playlist without necessarily interacting with the host. Alternatively, the user may create a playlist by accessing a web page provided via the host, either from a remote device or from the registered user's PC. In response to playlist selections, the host and/or agent processor directs the delivery of media content for the playlist to a network storage arrangement, and facilitates the selective configuration of the content based on one or more conditions such as those related to the capabilities of a playback device or communications links serving the same. In some applications, the network storage arrangement is automatically populated when a playlist is created, and in other applications, the network storage arrangement is populated with playlists in response to a user selection directing the population of the network storage arrangement.

When the registered user or a remote guest user wishes to access a playlist at a remote playback device, the user accesses a web page hosted by the host server, by way of a remote Internet access device such as a hand-held wireless telephone-type device. The user provides authentication information, such as the user name and password described above, and in response the host authenticates the user as an authorized user, and facilitates media playlist access by, for example, controlling the network storage arrangement to provide playlist media content to the remote playback device over the packet-based network.

In some applications, the remote user (registered or guest) provides information to the host server characterizing a desirable format for delivery of playlist content. This information may be provided directly, such as by the remote user making selections from a hosted web page to indicate a desired data type, or indirectly, where the host server determines the type of media playback device from which the remote user is accessing the playlist. In this regard, the particular format of the media content in a playlist need not necessarily be predetermined upon creation of the playlist. This is useful, for example, where details regarding a remote access device or available communications links to be used to access the playlist are unknown.

In some applications and as consistent with the preceding paragraph, the host server determines a format type for a playlist based upon available communications mediums over which the playlist can be sent to the remote playback device. For instance, the host server may facilitate delivery of high-bandwidth playlist media content upon determination that the remote playback device has access to a relatively high-bandwidth connection to the Internet, such as via a high-speed wired or Wi-Fi Internet connection. Similarly, the host server may automatically format a playlist into a relatively low-bandwidth format upon detection that delivery of the playlist to the remote playback device will be over a relatively low-bandwidth connection and/or that communications links to the remote playback device are unreliable.

The above approaches, as well as those discussed in the figures, are selectively implemented in connection with one or more example embodiments as described in U.S. Pat. No. 7,139,834 entitled "Data Routing Monitoring and Management" and U.S. patent application Ser. No. 11/056,345 entitled "Network-Distributed Data Routing", both of which are fully incorporated herein by reference. For example, various approaches to media content transfer, user registration, media content caching, remote access and more, as described in U.S. patent application Ser. No. 11/056,345, are implemented to facilitate remote control of and access to media content such as media at a remote playback device as described herein. In addition, approaches to playlist media content delivery in accordance with various communications links and available playback devices may be implemented as described in U.S. Pat. No. 7,139,834.

In connection with the examples described herein, playlist-based media content that is made available for remote access includes media content that is available to a registered user's packet-communicating device. In this regard, a packet-communicating device may include one or more of a personal computer, set top box, web camera, media renderer or content storage system at a home or business location with network access, or any combination thereof. Furthermore, a remote user (e.g., using a remote packet-based device) may include one or more individuals, such as members of a household, employees of a business entity or simply an individual given access authorization by a registered user. In addition, a remote playback device may include a packet-based device that facilitates communications over a packet-based network to receive playlist media, as well as a playback device that is not necessarily be packet-based. Further, a "user" may be a machine functioning automatically, for example, as programmed by an individual.

In the context of various examples described herein and shown in the figures, reference is made to several representative devices, networks and network communication approaches. Various terms such as Internet, web-enabled, packet, packet-based and others may be applicable in the context of different embodiments to facilitate the description of different examples. However, the devices, networks and network communications approaches described in connection with example embodiments herein may be applicable to variety implementations and descriptive terms. For instance, devices that could be described as a packet-based device or an Internet appliance may include one or more devices that communicate over a path characterized by one or more of a packet-communicative, web-based and/or Internet-based communications link. In this regard, devices referred to as packet-based or Internet-related are selectively implemented using one or more of a variety of packet-communicative approaches, and may include a combination of devices including a device that accesses a packet-based network and another device that is not necessarily packet-based. In addition, such devices may, for example, access the Internet via non-Internet-based communications approach, such as via one or more wired and/or wireless links that use one or more of a variety of communications approaches. Moreover, packet-communicative approaches described herein are applicable to a variety of network communications approaches, including those involving communications referred to in connection with one or more terms relating to packet, frame, block, cell and segment terms.

Playlists are managed using one or more of a variety of approaches, including those described with the association above, as well as other relatively complex approaches involving modification of the data, specific file cross-referencing and storage approaches, and further at one or both of a hosted content storage and a registered user's media source. For instance, a registered user may request that media be stored in a particular format, or media rights associated with media dictate that media be delivered in a particular format. The following embodiments discussed in connection with the Figures exemplify a variety of approaches to media content storage and configuration.

FIG. 1 shows a system 100 for routing and managing media playlist content via a packet-based network using a hosted access approach, according to another example embodiment of the present invention. The system 100 includes a network-based (host) server 110, a plurality of remote packet-based playback devices 120-M, a plurality of registered media content sources 130-N and a plurality of media playback devices 150-X, all of which communicate over a packet-based network 105. The remote packet-based devices 120-M include, for example, a mobile telephone, a portable computer (e.g., a laptop PC), digital media device such as an mp3 player or video player or a personal media content assistant (PDA) device. Such devices may also be implemented as a media content source in a manner not inconsistent with that described in connection with the registered media content sources 130-N, and generally facilitate access to registered-user media content at a media playback device either directly or via a network cache 140.

The network 105 includes one or more packet-based networks such as the Internet and, where appropriate, other networks such as a mobile telephone network or a local area network (LAN). In some applications, the network 105 is a local area network implemented for a local premises such as a home or business. In other applications, the network 105 is (or includes) a virtual network or set of virtual application communication channels within a processor or group of processors associated with a computing appliance.

Where implemented, the network cache 140 includes media content storage media for storing playlist-based media as well as any corresponding information characterizing playlists, and further has access to the packet-based network 105. While shown as a single item in FIG. 1, the network cache 140 may be implemented with a plurality of devices, at one or more of a plurality of locations. For example, some or all of the network cache 140 may be located at the network-based server 110 or at the registered media content source 130.

Each of the registered media content sources 130-N includes an agent processor (see agent processor 132 of registered media content source 130) that facilitates communication between the registered media content source and the network-based server 110. The agent processor 132 directs the selective routing of media content 136, in accordance with a playlist or playlists to which the content applies, from the registered media content source over the packet-based network 105.

Playlist data 138 includes information characterizing media belonging to a particular playlist as identified by a registered user, is stored at the registered data source 130. This playlist data 138 may also include information characterizing different instances of a particular piece of media content that is stored under different characteristics, such as under different bitrates or formats. Generally, the playlist data 138 facilitates access to and management of media for use in providing and/or serving the media to one of the remote packet-based playback devices 120-M. In some instances, the agent processor 132 uses the playlist data 138 to manage stored media 136, in directing the identification, configuration and storage of the media at the registered media content source 130 and, where appropriate, at the network cache 140, to facilitate remote playlist-based access by users at remote packet-based playback devices 120-M. In this regard, the various approaches to playlist management and implementation described above without reference to FIG. 1 are applicable here, for use in connection with certain example embodiments.

To facilitate remote playlist-based media access, management and playback, the network-based server 110 includes an agent gateway 112 that communicates with the registered media content sources 130-N, a browser gateway 114 that facilitates access by remote packet-based playback devices 120-M using authorization criteria 116. A playlist processor 118 uses inputs received from registered and/or remote users to manage the identification and storage of playlist information and, where appropriate, of media content to which the playlist information applies. Communications between the various components of the network-based server 110 and the remote packet-based playback devices 120-M, registered media content sources 130-N and network cache 140 are via the packet-based network 105.

The following approach to remote-user playlist-based media content access is described in connection with FIG. 1 for one particular example embodiment. A registered user a the registered media content source 130 establishes an account with the network-based server 110 (e.g., for a fee), downloads the agent processor 132 and installs the agent processor at the registered media content source, and establishes playlist data 138 to organize and arrange media content 136.

The playlist data 138 may, for example, be implemented separately from the network-based server 110, the agent processor 132 and any subscription. For instance, the playlist data 138 may simply be a user-defined list associated with one or more software-based or hardware-based media storage approaches, such as those implemented with Windows Media Player available from Microsoft of Redmond, Wash.; with iTunes media and/or an iPod device available from Apple Computer of Cupertino, Calif.; or with a digital video recorder available from TiVo of Alviso, Calif.

Once the registered user has installed the agent processor 132, registered for service and stores some sort of media content 136 for remote access, the registered user's media can be accessed remotely. The agent processor 132 initiates a communications link with the agent gateway 112 at the network-based server 110 upon startup of the registered media content source 130 (e.g., upon startup of a computer at the registered user's home, which may store or otherwise have access to the media 136 and playlist data 138).

The link established between the agent processor 132 and the agent gateway 112 may be persisted, such that the network-based server 110 can access the registered user media content source 130 without necessarily requiring the at the content source be addressable. This approach is useful, for example, where the registered user content source 130 is a personal computer (PC) on a home network coupled to the Internet, which generally requires that the PC initiate a communications link via the Internet so that the network-based server 110 can in turn communicate with and control the agent processor 132 for directing the routing of media over the Internet.

A remote user at the remote playback device 120 accesses a web page hosted via the browser gateway 114, and provides authentication information such as a user name and password. The browser gateway 114 uses authorization criteria 114 to authenticate the remote user. In some applications, the authentication criteria specifies registered-user preferences, or media rights-base information, for controlling the media access by the remote user.

Once the browser gateway 114 authenticates the remote user, the remote user is presented with playlist information retrieved from the playlist data 138 via the agent gateway 112 and agent processor 132. The user can then select one or more playlists for playback by providing the selections via the web page hosted by the browser gateway 114, and the agent gateway 112 in turn processes the selection by controlling the agent processor 132 to route (e.g., stream) the appropriate media content, via the Internet, to the network-based server which provides the content to the remote packet-based playback device 120.

In some instances, a playlist is predefined for the remote user, such as wherein a registered user wishes to share a particular audio playlist with the remote user. In such applications, the remote user's authorization criteria may include information that also identifies a playlist, or the authentication criteria 116 may be predefined with such information. In these instances, the appropriate playlist media content may be automatically provided to the remote user, without necessarily requiring any remote user selection. Such an approach may be implemented, for example, by providing the remote user with a URL for a web page hosted by the browser gateway 114 and further including sufficient information for defining a particular playlist.

In another embodiment, the system 100 facilitates electronic token-based access to playlist content as follows. When a user (e.g., owner) of registered media content source 130 wishes to share a particular playlist or set of playlists with another user, or to remotely access his or her own playlists, the registered user directs the creation of an electronic token that specifies information that can be used to identify a playlist or playlists to which access is to be provided. The media content that is the subject of the token is made available, and in some instances pushed to the network cache 140, and the electronic token is provided for access by a remote user. When such a remote user implements the token (e.g., by providing the token with authorization information toe the network-based server 110), the network-based server responds by directing appropriate playlist content to a particular media playback device specified via the requesting remote user. In some applications, the token includes format, bitrate or other information specifying characteristics of playlist content to be provided via the token; where appropriate, media content is managed or modified by the agent processor 132 and/or playlist processor 118 to ensure that the content is available with the desired characteristics. For general information regarding media content transfer, and for specific information regarding token-based media content transfer applications that may be implemented in connection with these and other example embodiments, reference may be made to U.S. patent application Ser. No. 11/374,414, entitled "Token-based Remote Data Access" and filed on Mar. 13, 2006, which is fully incorporated herein by reference.

The network-based server 110 also directs or otherwise controls the caching of media content in the network cache 140, and the delivery of cached media content to the remote packet-based playback devices 120-M. When a registered user at the registered media content source 130 subscribes to storing data in the network cache, the agent processor 132 pushes media content to the network cache 140 directly via the network 105 or via the network-based server 110. Similarly, the agent processor 132 provides media content to the cache 140 to reflect updates in a playlist stored at the cache.

Generally, the cached media content is accessed in a manner similar to that described above in connection with access to the media 136 at the registered media content source 130, with the network-based server 110 directing the delivery of content in the network cache in response to remote user playlist access. Generally, the network-based server 110 also facilitates cache access in accordance with the media available thereat, relative to media available at a corresponding registered user content source (i.e., where requested playlist data is available in the cache, access to data in the cache may be preferred over access to data at a registered user content source). Various approaches to storing, formatting, removing and otherwise managing media content in the cache 140 are implemented in connection with one or more approaches as described above, prior to the discussion of FIG. 1. In addition, for general information regarding remote media access, and for specific information regarding the implementation of a network-based cache for storing, managing and accessing data (media) as may be implemented in connection with one or more example embodiments of the present invention, reference may be made to U.S. patent application Ser. No. 11,435,357 entitled "Rule-based Caching for Packet-Based Data Transfer" and filed on May 16, 2006, which is fully incorporated herein by reference.

Figure 2:
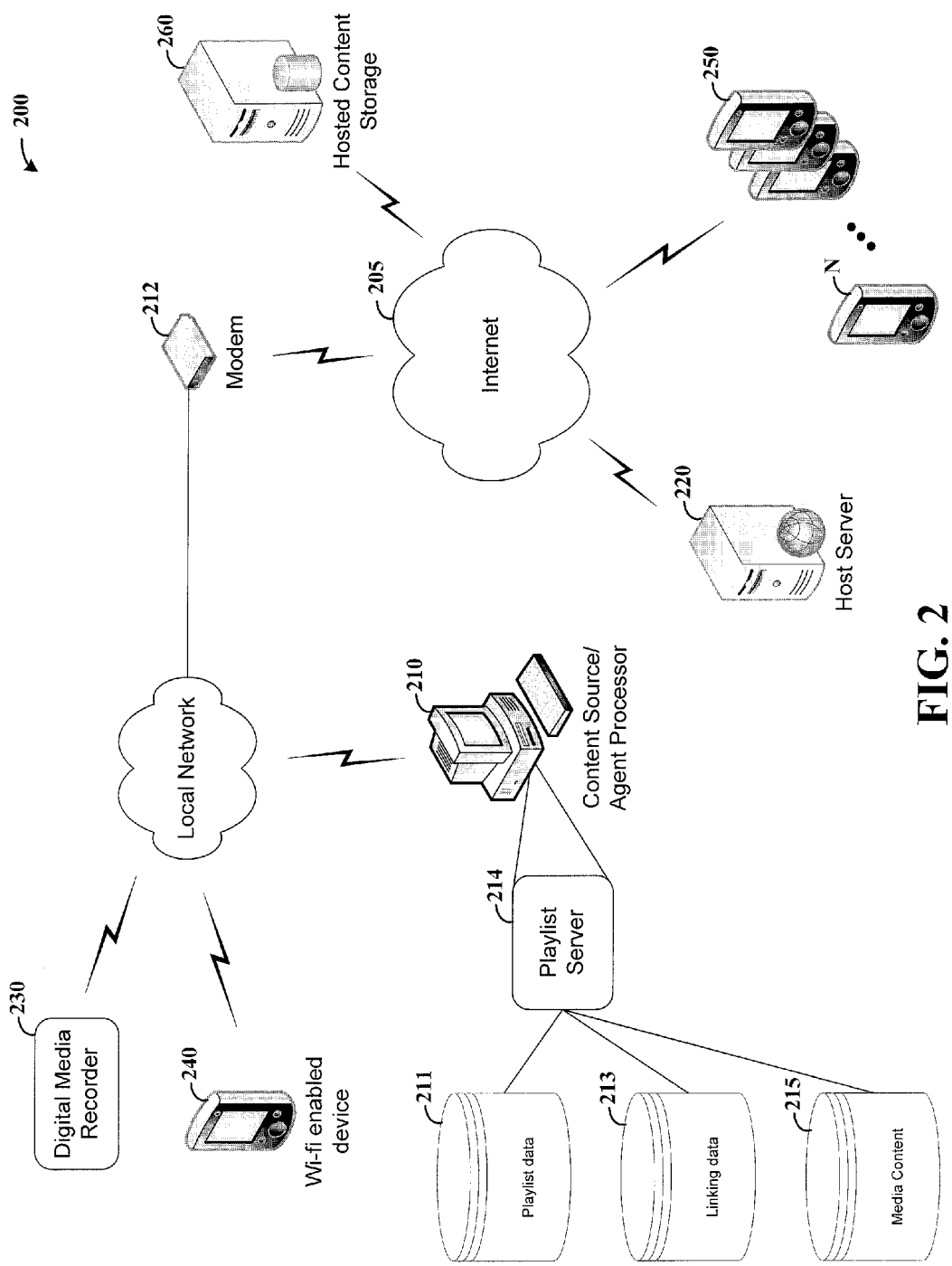
FIG. 2 shows a system and approach for storing and managing registered-user media content for host-controlled remote access, according to another example embodiment of the present invention.

FIG. 2 shows a system and approach 200 for storing and managing registered-user media content for host-controlled remote access, according to another example embodiment of the present invention. The system 200 includes a host server 220 that coordinates the presentment of media content and related playlists to remote media access devices 250-N. The media content and related playlist data are accessed via one or both of a hosted content storage 260 and a user's content source arrangement including a content source 210. The host server 220, hosted content source 260, remote playback devices 250-N and modem 212 communicate via the Internet 205. Locally, the content source 210 communicates with media content sources including a digital media recorder 230 and Wi-Fi enabled device 240, and further with the modem 212 to communicate via the Internet 205.

The content source 210 implements a playlist server 214, internally (e.g., via software) or externally at a separate device. The playlist server 214 manages data including playlist data 211, linking data 213 and media content 215 shown by way of example in separate data arrangements. Generally, each of the playlist data 211, linking data 213 and media content 215 is made available to the playlist server 214 from one or more local or remote storage sources. These storage sources may include, for example, a single local or remote data arrangement such as a hard drive in or local to the content source 210 and the hosted content storage 260, or with two or more such arrangements. The playlist data 211 includes information specifying media content (e.g., by title) for specific playlists, the linking data 213 includes data linking content to one or more playlists, and the media content 215 is the content itself that is made available for remote access by way of playlist access. In this regard, where a playlist specifies a particular media title such as the title of a song, the linking data links that playlist with appropriate content having requisite characteristics such as bitrate or file type and stored with the media content 215. When user preferences and/or available media content change, the linking data reflects any related changes to ensure that playlists are linked to data that can be used in serving requests for content in the playlists.

By way of example, the system 200 is shown and described with an example components such as a single content source 210, remote playback devices 250-N, host 220 and hosted content storage 260; however, the system and corresponding approaches may be implemented with a multitude of such components, operating separately or interactively. For instance, the various remote media access devices 250-N selectively access content from other content sources similar to the content source 210, also operating with an agent processor locally or remotely, and with selective use of the hosted content storage 260 (or another similar storage). Further, while illustrated as similar devices, the remote media access devices 250-N are implemented with one or more of a multitude of different devices, depending upon the application.

In some embodiments, the host server 220 facilitates the management of media content playlists with the playlist data 211 using inputs from one of the remote media playback devices 250-N. In one application, the host server 220 interacts with remote users accessing a web page hosted by the host server by first authenticating the remote users and, based upon the authentication, presents one or more playlists for management. In response to inputs from an appropriately authenticated user at a remote media playback device, the host server 220 communicates with the content source 210 to manage one or more of playlist data 211, linking data 213 and media content 215. Further, where some or all of the playlist, linking and media content data 211,212 and 215 is stored at the hosted content storage 260, the host server 220 facilitates changes as appropriate to data in the hosted content storage 260 in accordance with authorized user inputs.

In other example embodiments, the system 200 serves registered users having rights to a common media file by storing a single version of that media file at the hosted content storage 260 (e.g., with each registered user operating a content source 210 and/or other related media source). When each registered user creates a playlist having the common media file, the host server 220 and/or the hosted content storage 260 stores information characterizing the media file and the registered users, rights thereto. When one of the remote media playback devices 250-N is implemented to access the playlist (and corresponding common media file) via permission by or association with one of the registered users, the host server 220 provides access to the common media file. In some applications, and as may be implemented in connection with the embodiments described in connection with FIG. 4, a file structure that facilitates access to the common media file is used for each registered user having rights to the common media file.

Figure 4:
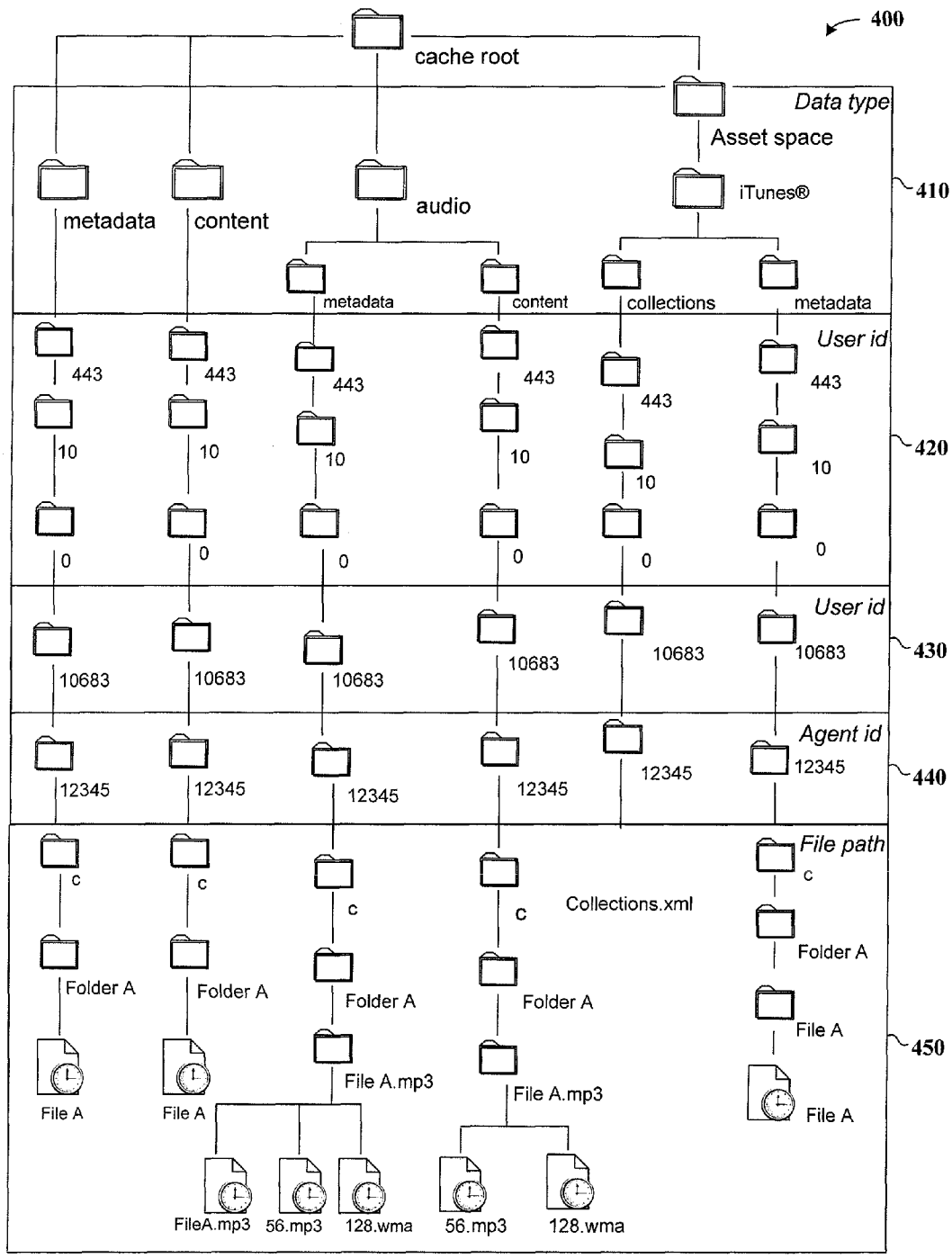
FIG. 4 shows a file arrangement and approach for facilitating access to media content playlists, according to another example embodiment of the present invention.

In still other example embodiments, the system 200 facilitates streaming media distribution for a media service provider by storing playlist-based media content for that service provider, and providing access to the playlists to subscribers to the media service. For instance, where a digital audio service provides streaming access to audio tracks, that service (e.g., operating a content source 210) provides information and, as appropriate, media content to the hosted content storage 260. Using a file structure as indicated in FIG. 4 or otherwise using stored information characterizing authorized users and their respective rights to access selected media content provided via the digital audio service, the host server 220 selectively streams audio tracks for an appropriate playlist to subscribers at remote media content sources 250. With this approach, subscribers can purchase the rights to listen to audio tracks and access the tracks via streaming delivery and playback, without necessarily storing the audio tracks. This is useful, for example, for providing access to a very large amount of media content at a mobile device having relatively low memory capabilities that could be used for storing the media content.

Generally, the various approaches described in connection with FIG. 2 above for content management and routing may be implemented with one or more aspects of the system 200. For instance, referring to FIG. 1, one of the registered data sources may be implemented with the modem 212, content source/agent processor 210 and additional media source devices including the digital media recorder 230 and the Wi-Fi enabled device 240. Content from the content source 210 or one of the media source devices is made available either directly or via the hosted content storage 260 using a playlist management approach.

Figure 3:
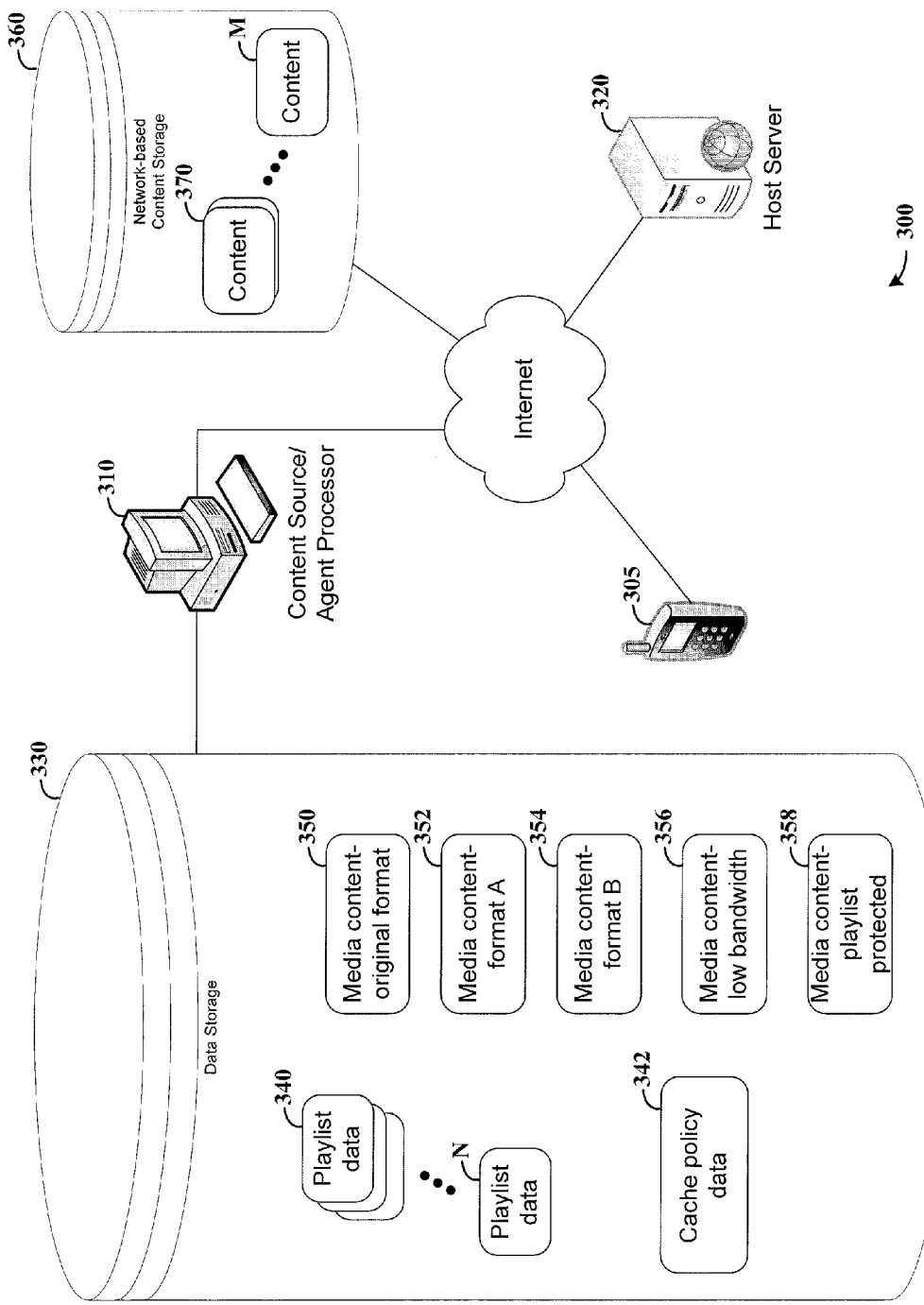
FIG. 3 shows a system and approach for managing media content playlists, according to another example embodiment of the present invention.

FIG. 3 shows a system and approach 300 for managing media content playlists in multiple formats using network-based cache storage, according to another example embodiment of the present invention. With similarities to the above example embodiments described in connection with FIG. 1 and with FIG. 2, the system 300 includes a host server 320 that facilitates access by a remote packet-communicating device 305 to media content made available by way of a content source 310 implementing an agent processor. Generally, the packet-communicating device 350 is a remote computer, a mobile phone or other electronic device with Internet capabilities. Content files 370-M are provided (e.g., pushed) to a network-based content storage 360 by the content source 310, and the host server 320 sources content from the content storage when requested by an authorized user at the packet-based device 305.

Content and media playlist information is stored locally to the content source 310 in a data storage arrangement 330, to include one or more data storage devices such as a computer hard drive or media recording device. A data storage arrangement 330 stores media playlist and content data that is used in populating the network-based content storage 360 in accordance with the playlist data and a content format suitable for use with appropriate packet-based devices. Generally, the content is stored in one or more formats to suit the particular packet-based device or devices that will be accessing the content, and the stored content is pushed to the network-based content storage 360 for remote access by the packet-based device or devices.

By way of example, several types of media content are shown with the data storage arrangement 330, including content in an original format 350 (e.g., as-purchased), content in alternate formats A and B (352 and 354 respectively), low-bandwidth content 356 and playlist protected content 358. Generally, the various content formats are stored in response to characteristics of expected access to the content, including one or more of capabilities of the device accessing the content, characteristics of communications links serving the device, and storage space in the network-based content storage 360.

In addition to content, the data storage arrangement 330 also stores playlist data 340-N for different playlists served by the content source 310, and cache policy data 342 that is used in pushing data to the network-based content storage 360. Specific playlists and cache policies are established and managed by one or more of a user at the content source, the host server 320 and a user at the remote packet-based device 305. For instance, when a playlist is created, that playlist is added as one of the playlist data sets 340-N. Similarly, when cache policies such as those specifying playlist-based content to be stored in the network-based content storage 360 are established or changed, the cache policy data 342 is accordingly modified. In accordance with the cache policies, one or more types of content for playlist content is pushed to the network-based content storage 360 and stored with content 370-M. In this regard, the content 370-M includes one or more formats of data as shown with the data storage arrangement 330, in accordance with playlist data 340-N and, where appropriate, cache policy data 342.

The following approach describes one implementation for storing and accessing data for a particular registered user's content source in accordance with media content playlists, according to another example embodiment of the present invention. This approach may be implemented in connection with one or more figures as described herein and, by way of example, is discussed as implemented with the arrangement 300 in FIG. 3.

An authorized user is presented with the available media content such as digital audio and/or video at the data storage arrangement 330 and/or in other storage accessible via the content source 310. In many applications, this presentation is effected by a software-implemented program running on the content source 310 and accessed by a user at the content source. In other applications, this presentation is effected by the host server 320 in presenting a web-based interface for access to a user at one or both of the content source 310 and the remote packet-based device 305. In any instance, the media presented may include all media at the data storage arrangement 330, or a subset of the media based upon conditions such as the type of content, media rights associated with the content and the type of device at which access to the content is to be carried out.

Using the content source 310 or the remote packet-based device 305, the user selects a playlist to be moved to storage. These selections are used at the content source 310 (e.g., with a software-implemented agent processor operating at the content source) to create a cache policy that is stored with cache policy data 342. Generally, the cache policy includes sufficient information to identify content for the playlist as well as other information needed or desired in relation to expected access to the content. For instance, in some applications, the cache policy includes a playlist identifier and a list of encoding identifiers, with each encoding identifier defining an encoded version of a media file that should be placed in the cache as part of the selected playlist. This approach may suit the use of two or more different remote packet-based devices in accessing content identified in the playlist, or suit two or more different content access scenarios relating to content delivery characteristics such as available bandwidth.

Once a playlist has been selected and an appropriate cache policy created, the agent processor at the content source 310 processes data in the policy to facilitate storage of data in the network-based content storage 360. Generally, the agent processor evaluates the cache policy by querying a content storage library, characterizing media content at the data storage arrangement 330, for the contents of the identified playlist. This query is compared with the current contents of the network-based content storage 360 by accessing the same or by accessing information identifying the contents of the network-based content storage. This comparison is used to identify media content to be pushed to the network-based content storage in accordance with the playlist. For instance, where media content for the playlist is already stored at the network-based content storage 360 (and, where applicable, in an appropriate format), that content does not need to be pushed to the network-based content storage 360. Playlist content that is not available at the network-based content storage 360 is accordingly pushed to the network-based content storage for remote playlist access. Where appropriate, one or more items in the resulting playlist are transcoded or otherwise modified for encoding identifiers in the corresponding cache policy data 342, and each resulting file is scheduled for upload to the network-based content storage 360.

Once the network-based content storage 360 is populated with content, the host server 320 serves the populated content to authorized users at remote packet-based devices. When the host server 320 receives a request for a media file either directly or by way of a playlist request, the device making the request is classified and the device class is used to map to an appropriate encoding of the file to deliver. In some applications, the classification is made by way of the request or otherwise accessing information from the device, and in other applications, the device classification is retrieved from data stored for a particular user (e.g., at the data storage arrangement 330). The host server 320 locates the appropriate version of the requested media file in the network-based content storage 360 and serves the contents of the file.

As discussed above, content in different bitrates is stored and presented as appropriate for various applications. In some instances, a user selects a bitrate when making a request for media content, by either directly making a selection, or simply by accessing the Internet using a connection having particular bandwidth characteristics that are amenable to use with a particular bitrate. For instance, where a user accesses the Internet via a mobile telephone network, the connection may be of a relatively low bandwidth and, correspondingly, a selection is made for a relatively lower-bitrate content file. In response to this selection, the host server 320 delivers content in a selected bitrate. For some applications, content is stored in two or more predefined bitrates, and in response to the selection, content in one of the bitrates is selected and provided to a remote user.

In some applications, device classes are used in configuring and providing content to remote devices, based upon the class in which a particular requesting remote device falls into. Each device class is mapped to two sets of encoding parameters for high and low bitrate, and a media content file is created in accordance with the encoding parameters and each of the high and low bitrates. For instance, an agent processor running on the content source 310 may implement device classification data as part of or in connection with the cache policy data 342 to facilitate such configuration of content that is subsequently pushed to the network-based content storage 360. In these applications, the network-based content storage 360 maintains at least two versions of each content file, to include high and low bitrate versions for each device class format.

In response to a bitrate selection as described above, the network-based content storage 360 returns high or low bitrate content, and in some applications, returns the high bitrate version by default unless a selection or request specifying low bitrate is received. This response is carried out at the network-based content storage 360 and/or facilitated by the host server 320 via interaction with a remote device (305) via hosted web page or otherwise.

Playlist information (collections of files grouped into playlists) is stored separately from the individual content files. Within a playlist, content files are referenced in an encoding agnostic manner, such that the same playlist information can be used by all classes of remote devices accessing the content. Separating content from playlist information facilitates the support of multiple sources of playlists (e.g., as arranged by different software programs) and allowing them to share encoded audio content stored in the network-based content storage. As shown in FIG. 3, playlist data 340-N is shown stored at the data storage arrangement 330; however, in some applications, this data is also pushed to the network-based content storage 360 and used accordingly in serving requests from a remote device such as the device 305 for access to a particular playlist.

As discussed above, information regarding the content made available via the content source 310 is stored and used in organizing playlists and more. In some applications, such information is maintained as metadata and stored for at least two levels of metadata maintained for each content file. One level includes metadata supplied by a content management application, such as a digital audio software application used for managing audio or video content, which provides specific metadata regarding a file, such as a rating. For instance, software and/or hardware available from Microsoft, Inc. of Redmond, Wash. (e.g., Windows Media Player®) and from Apple Computer, Inc. of Cupertino, Calif. (e.g., iTunes®) may be implemented in connection with this approach, with metadata from the same used for organizing playlists. Another level of metadata includes metadata that is specific for each encoded version of a media file, such as the bitrate of an encoded file. Using this approach and by way of example, where three encodings of a content file exist, there are at least three such metadata files.

A variety of approaches are implemented for storing and linking or mapping media content files with playlists for a multitude of users, and these approaches are implemented across one or more types of content management approaches (e.g., different software or hardware approaches as described above). The following discussion may facilitate operation in connection with FIG. 4 discussed further below, and as such describes example approaches to facilitate such linking or mapping in connection.

Generally, the Storage of content is separated from the storage of content metadata, content metadata is extendable and supports an open-ended collection of attributes, both content and content metadata should be organized in a way that allows efficient lookup based on standard paths such as those of the format: {agentid}/{agent_directive}/{path}. Here, the term agentid identifies a content source operating an agent processor (e.g., source 310 in FIG. 3), the term agent_directive identifies a directory for a particular file, and the term path refers to the specific path for the file.

Both content and metadata are stored using a simple network accessible file system, with the storage maintained under a single root directory. Each user has a specific directory where each agent processor associated with a given user is represented by a sub-directory of that specific user directory. In some applications, a naming convention for the directory structure is {userid}/{agentid}, with the term userid related to an identification of a particular user (i.e., a subscriber) and the term agentid as described above.

Subfolders of the storage root directory include the following subfolders: a metadata subfolder for storing metadata, a download folder for temporarily storing files that are being uploaded, a content folder to store complete content files, a FIFO folder to store user policies and/or other information, a lookup folder for storing lookup information (e.g., a lookup table) for mapping an agentid to a userid, a ghost folder for storing ghost files metadata, and an asset name folder to store the name of an asset space (i.e., a collection of content stored in one or more locations) that any application targets.

Users are mapped, via their respective userid data, to a folder in the above-described file system. To facilitate the support of a large number of users in the system, users are divided among different directives in the system in an organized fashion. With this approach, relatively fewer subfolders/files are in each directory, and disk access speed is not hindered as greatly due to relatively large directories.

Users are mapped to their specific user directory based upon bit mask operations to compute a path on the file system based on a userid. One example approach to this computation is as follows. A userid is set to the number 10683 by way of example. The binary representation of this userid is: 00 0000000000 0000001010 0110111011. The 10 right bits are masked and that number is computed, 10 bits are shifted to the right and the next 10 bits are masked, and the process is repeated another time for the other 10 bits, as follows: 0110111011=443; 0000001010=10; 0000000000=0. The three numbers are put together to form the path for this userid as 443/10/0/10683. For a lookup file system tree, the agentid is used to map into the directories (see, e.g., FIG. 4 by way of example).

Taking the example of a file system for Content, Metadata and Download directories as stored in network-based content storage, the storage layout is a mirror copy of each other for each particular file. The first folder level underneath the root are for the different data types (metadata, downloading files, and actual content). The second level includes three folders that are the path to a specific user ID folder as described in the section above. The third level is the user ID folder, the fourth level includes one or more agent ID folders. The fifth level is essentially the folders of the drives with all the stored subfolders underneath them.

In some applications, at the agent ID level, there are two files called usermetrics.txt, and userquota.txt stored together with the agent ID folders. These files contain information about the user's storage quota (e.g., for storing content in the network-based content storage 360), and amount of bytes the user has uploaded or is uploading.

Other folders are similarly implemented. For instance, an asset name folder is similar to the content and other directories through the agent ID level, where a file called collections.xml is located and includes the actual locations of the items under that file location. A ghost folder contains the same file structure as metadata, content, and download. The ghost folder includes information about ghost files in folders that are being persisted, as well as the ghost information about its parent folders.

A FIFO folder is different than the previously mentioned types, with an agent IF folder potentially having different folders for different FIFO types. Policies are stored in the FIFO folder, and in some applications, other information such as those pertaining to mms uploads are also included. The policies folder further includes different share policies and user created policies.

For a lookup folder, a simple file system is used, with an agent ID text file that simply contains the user ID in its contents and helps the cache manager find the user for a specific agent processor.

FIG. 4 shows a file system approach 400 to storing and providing data using a file structure approach similar to that referenced above, with storage of data in two or more formats for delivery to a remote packet-based device. For these applications, a folder is included with the tree structure for each content type, such as audio or video. Further, additional folders and related directory trees are implemented for application-specific file access, such as those described above.

Here, a first file level 410 is for data type and includes metadata, content, file type (audio, by way of example) and asset space folders, with an iTunes® folder shown by way of example and with each of the audio and iTunes® folders respectively including subfolders for metadata and content, and for collections and metadata. Other file types such as video, and other asset space folders such as those for another digital audio product may be similarly implemented. Second and third file levels 420 and 430 show a hierarchy of folders according to a user ID as described by way of example above (443/10/0/10683). A fourth file level 440 is for an agent ID associated with the particular user ID (for only one agent processor as shown here). These second through fourth file levels 420-440 are consistent among the different files at level 410. A fifth level 450 is for collection data and/or the actual file path for content files, here showing multiple file configurations for each specific file (e.g., for different bitrates and/or file types). By way of example, the indicated "file A" is not necessarily duplicated, but is accessible via the structure shown (e.g., file A may be referenced via the iTunes® metadata as well as other). Similarly, where different asset spaces refer to a common file (e.g., an audio file at a certain bitrate and configuration), that file may only be stored once, with access to the file facilitated via access via either such asset space.

Referring specifically to the audio folder at level 410, this folder includes sub folders called metadata and content that have file system-related metadata, audio-related metadata and transcoded files, respectively. The files stored under these folder(s) are a mirror of the original metadata and content directories until the file level, where a folder is in place of a file under the metadata and the content directories with the same name as a file that is being persisted. In the metadata directory under this folder, there is a metadata file that has file metadata properties similar to that which exists in a current metadata file, with additional metadata files based on the type of the file and the kind of transcoding that will be applied to it. This encoding type is generally based upon the device class targets, which will have audio related metadata and the cache (network-based storage) state and metrics. The content directory has multiple versions that exist for in the cache for each file. There is duplication of metadata if the same file persisted both under the files and folders and also under the audio folder.

The asset space folder at level 410 includes all of the asset spaces that any application targets, here showing an iTunes® asset space by way of example. The storage layout of the asset space folder and its subfolders is similar to the other directories through the fourth (agent ID) level 440, after which a file called Collections.xml is located, identifying the actual locations of the items under that collection. The metadata relevant to each particular asset space is also stored in a path that mirrors the path under the content and metadata directories.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, the functions carried out by servers, media content sources, playlist managing devices (including software-implemented devices), and network caches are selectively implemented together and/or in different arrangements, depending upon the application. Further, media playlist content sources are selectively implemented with mobile-type devices, such as mobile Internet appliances (e.g., mobile telephones, laptops or personal devices); media content can be made available from such devices to other remote devices. These approaches are implemented in connection with various example embodiments of the present invention. Such modifications and changes do not depart from the true spirit and scope of the present invention, including that set forth in the following claims.

What is claimed is:

1. A system comprising:
   a network-based storage that
      identifies at least one media content title under at least two playlists and at least two formats of media content files for the at least one media content title based, at least in part, on a cross-referencing file structure, and
      determines to store media content and playlist data based, at least in part, on the identification of the at least one media content title and the at least two formats; and
   a host server that
      in response to a request for a playlist, identifies at least one media content file associated with the playlist based, at least in part, on the cross-referencing file structure;
      facilitates delivery of the at least one media content file from the network-based storage to a remote playback device based, at least in part, on the identification of the at least one media content file.

2. The system of claim 1, further comprising:
   a registered-user packet-based media arrangement configured to send playlist-based media content to the network-based storage over a data network.

3. The system of claim 2, wherein at least one of the host server and the registered user packet-based media arrangement selectively configures media content for playback at a remote playback device by configuring the media content to a bitrate that is different than a bitrate of the media content in a first configuration as stored at the registered-user packet-based media arrangement.

4. The system of claim 2, wherein at least one of the host server and the registered user packet-based media arrangement selectively configure media content for playback at a remote playback device by configuring the media content to a format that is different than a format of the media content in a first configuration as stored at the registered-user packet-based media arrangement.

5. The system of claim 2, wherein the host server responds to playlist requests by authenticating the requests and, in response to a request being authenticated, communicating with the network-based storage to facilitate the streaming of media content for media content titles in the requested playlist to a remote playback device, using the file structure to identify media content files to be delivered.

6. The system of claim 2, wherein the host server facilitates delivery of the media content files from the network-based storage to a remote playback device by communicating with the network-based storage over the packet-based network.

7. The system of claim 2, wherein the host server facilitates delivery of the media content files from the network-based storage by controlling the network based storage to deliver the media content files.

8. The system of claim 2, wherein
the registered-user packet-based media arrangement establishes a communications link with the host server over the packet-based network, and
the host server controls the registered-user packet-based media arrangement to send the playlist-based media content to the network-based storage.

9. The system of claim 2, wherein the registered-user packet-based media arrangement accesses the packet-based network to establish communications with the host server over the packet-based network, wherein the host server facilitates said sending of playlist-based media content over the packet-based network via the communications established by the registered-user packet-based media arrangement.

10. The system of claim 2, wherein the host server administratively controls the registered-user packet-based media arrangement to send playlist-based media content to the network-based storage over the packet-based network.

11. The system of claim 2, wherein the registered-user packet-based media arrangement includes a personal computer connected to the Internet via a modem, and wherein the host server administratively controls the personal computer, using communications established with the host server by the personal computer, to send playlist-based media content to the network-based storage over the data network.

12. A method comprising:
identifying at least one media content title under at least two playlists and at least two formats of media content files for the at least one media content title based, at least in part, on a cross-referencing file structure;
determining to store the media content and playlist data at a network-based storage based, at least in part, on the identification of the at least one media content and the at least two formats;
in response to a request for a playlist, identifying at least one media content file associated with the playlist based, at least in part, on the cross-referencing file structure; and
facilitating delivery of the at least one media content file to a remote playback device based, at least in part, on the identification of the at least one media content file.

13. The method of claim 12, further including:
determining to configure media content for playback at a remote playback device in response to at least one of: a user selection, data characterizing at least one remote playback device to which the content may be provided, characteristics of an expected delivery medium over which the content may be provided to a remote playback device, a desired quality of the media content, a desired bandwidth of the media content, media content access history for a particular registered user's media content, and a default format predefined for unknown playlist use.

14. The method of claim 12, wherein the media content is received based, at least in part, on:
a determination that a media content file in an appropriate format is unavailable at the network-based storage; and
a transmission of the media content file to the network-based storage based, at least in part, on the determination of the unavailability.

15. The method of claim 12, further including:
facilitating removal of media content from the network-based storage in response to a termination of a playlist by deleting media content files that are not associated with an active playlist.

16. The method of claim 12, further including:
in response to a request for a playlist, generating caching policy data including a playlist identifier and a list of encoding identifiers, each encoding identifier specifying an encoded version of a media content file to be placed in the network-based storage, and
wherein the media content is received based, at least in part, on:
an identification of media content files to be sent to the network-based storage based, at least in part, on a comparison of media content files in the playlist with media content files in the network-based storage,
a determination to transcode the identified media content files as a function of the encoding identifiers, and
a determination to send the transcoded media content files to the network-based storage.

17. A method comprising:
determining to establish a playlist based, at least in part, on a user request by generating a playlist identifier and a list of encoding identifiers, each encoding identifier specifying an encoded version of a media content file to be stored in the network-based storage;
identifying media content files to be transmitted to the network-based storage based, at least in part, on a comparison of media content files in the playlist with media content files in the network-based storage;
determining to transcode the identified media content files based, at least in part, on the encoding identifiers;
determining to transmit the transcoded media content files to the network-based storage, wherein the transcoded media content files are stored based, at least in part, on the identification of at least one media content title under at least two playlists and at least two formats of media content files for the at least one media content title according to a cross-referencing file structure; and
in response to a request for the established playlist specifying the playlist identifier, facilitating delivery of media content associated with the playlist to a remote playback device.

18. An apparatus comprising:
at least one processor; and
at least one memory including computer program code for one or more programs,
the at least one memory and the computer program code configured to, with the at least one processor, cause the apparatus to perform at least the following,
identify at least one media content title under at least two playlists and at least two formats of media content files for the at least one media content title based, at least in part, on a cross-referencing file structure;
determine to store the media content and playlist data at a network-based storage based, at least in part, on the identification of the at least one media content and the at least two formats;
in response to a request for a playlist, identify at least one media content file associated with the playlist based, at least in part, on the cross-referencing file structure; and
facilitate delivery of the at least one media content file to a remote playback device based, at least in part, on the identification of the at least one media content file.

19. The apparatus of claim 18, wherein the apparatus is further caused to:
    determine to associate at least one media content file with at least one playlist.

20. The apparatus of claim 18, wherein the media content is configured to playback at a remote playback device, and wherein the apparatus is further caused to:
    determine to associate the configured media content with at least one playlist and at least one related media content title based, at least in part, on the cross-referencing file structure; and
    determine to store the configured media content based, at least in part, on the association.

21. The apparatus of claim 18, wherein the media content is configured to playback at a remote playback device in response to at least one of: a user selection, data characterizing at least one remote playback device to which the content may be provided, characteristics of an expected delivery medium over which the content may be provided to a remote playback device, a desired quality of the media content, a desired bandwidth of the media content, media content access history for a particular registered user's media content, and a default format predefined for unknown playlist use.

22. The apparatus of claim 18, wherein the media content is received in a selected format in response to at least one of: a user selection, data characterizing at least one remote playback device to which the content may be provided, characteristics of an expected delivery medium over which the content may be provided to a remote playback device, a desired quality of the media content, a desired bandwidth of the media content, media content access history for a particular registered user's media content, and a default format predefined for unknown playlist use.

23. The apparatus of claim 18, wherein the apparatus is further caused to:
    identify, for a particular media content title, at least two media content files having different bitrates;
    determine to store information for identifying the bitrate of each of the at least two media content files; and
    in response to a request for a playlist specifying the particular media content title and at least one appropriate bitrate, facilitate delivery of at least one of the at least two media content files having at least one of the least one appropriate bitrate.

24. The apparatus of claim 18, wherein the media content is received based, at least in part, on:
    a determination that a media content file in an appropriate format is unavailable at the network-based storage; and
    a transmission of the media content file to the network-based storage based, at least in part, on the determination of the unavailability.

25. The apparatus of claim 18, wherein the apparatus is further caused to:
    facilitate removal of media content from the network-based storage in response to a termination of a playlist by deleting media content files that are not associated with an active playlist.

26. The apparatus of claim 18, wherein the apparatus is further caused to:
    cause, at least in part, presentation of a webpage to a remote user at a remote playback device;
    receive user input specifying media content to be placed in a particular playlist; and
    in response to the user input, receive media content for the particular playlist for storage in the network-based storage for remote access.

27. The apparatus of claim 18, wherein the apparatus is further caused to:
    determine to store media content files separately for each of a plurality of registered users; and
    in response to a request for a playlist from a specific registered user, facilitate delivery of registered user specific media content files.

28. The apparatus of claim 18, wherein the apparatus is further caused to:
    determine to store media content files accessible under different playlists designated to disparate registered users based, at least in part, on a file structure for each registered user, each registered user having separate rights to access the media content files, and
    in response to a request for a playlist designated to at least one of the disparate registered users, facilitate delivery of the media content files accessible under different playlists for media content titles in the designated playlist to a remote playback device based, at least in part, on the file structure.

29. The apparatus of claim 18, wherein the media content is configured to playback at a remote playback device by facilitating the storage of the media content in an original format.

30. The apparatus of claim 18, wherein the registered-user packet-based media arrangement
    in response to a request for a playlist, generate caching policy data including a playlist identifier and a list of encoding identifiers, each encoding identifier specifying an encoded version of a media content file to be placed in the network-based storage, and
    wherein the media content is received based, at least in part, on:
        an identification of media content files to be sent to the network-based storage based, at least in part, on a comparison of media content files in the playlist with media content files in the network-based storage,
        a determination to transcoded the identified media content files as a function of the encoding identifiers, and
        a determination to send the transcoded media content files to the network-based storage.

* * * * *